United States Patent Office

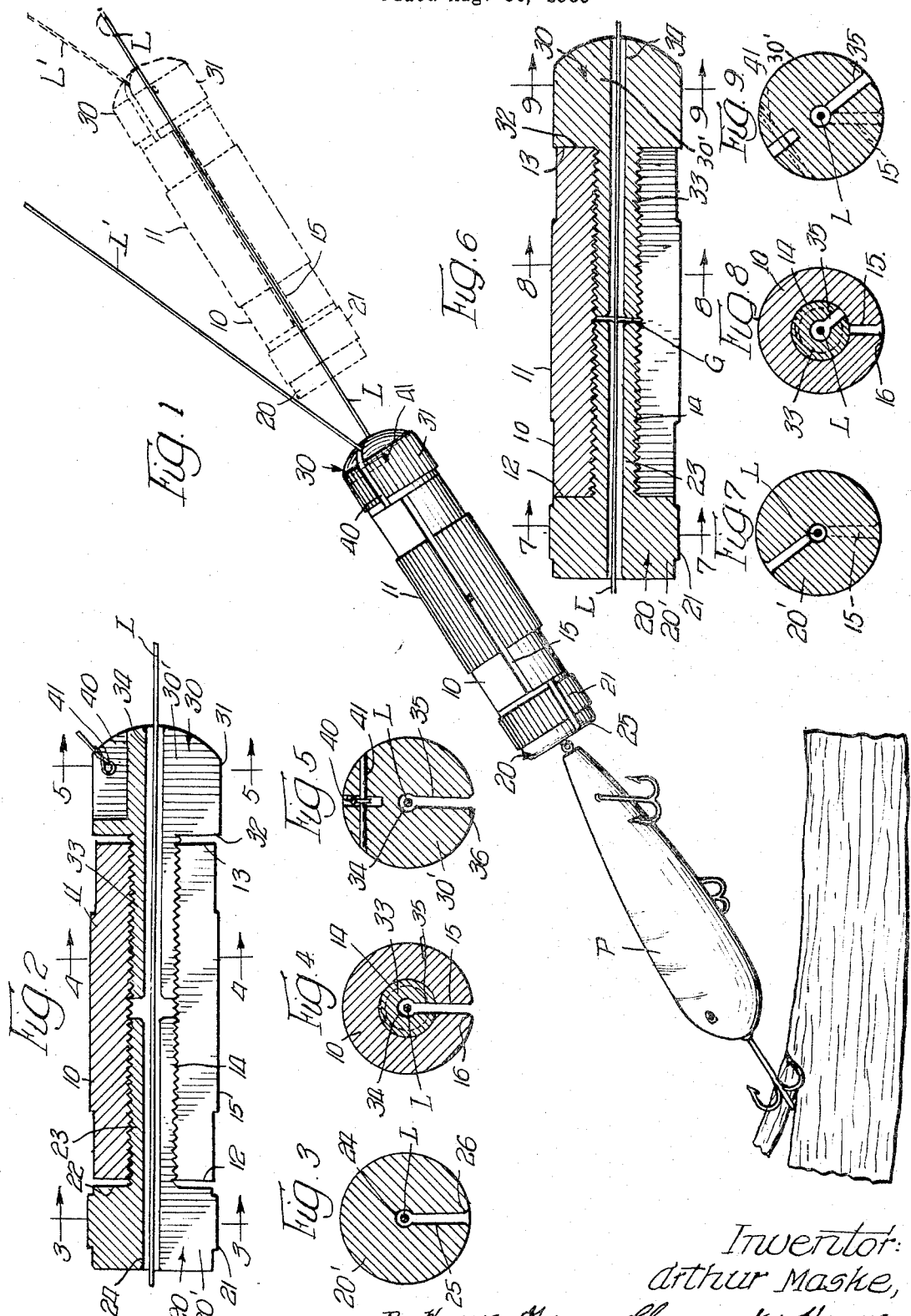

3,404,482
Patented Oct. 8, 1968

3,404,482
PLUG RETRIEVER
Arthur Maske, 155 Parks Ave., Joilet, Ill. 60432
Filed Aug. 30, 1965, Ser. No. 483,399
8 Claims. (Cl. 43—17.2)

ABSTRACT OF THE DISCLOSURE

A device for retrieving snagged fish hooks and plugs from underwater obstructions comprising a heavy elongated body having a threaded opening extending longitudinally therethrough, with a longitudinal body slot in communication with said opening throughout the length of the body, the ends of the body defining oppositely disposed abutment surfaces. A movable end cap is threadably engaged with the body adjacent each of the abutment surfaces, each end cap defining a shoulder frictionally engageable with the adjacent abutment surface, and preferably having the same external configuration as the elongated body and further including a threaded shank portion joined to the head portion and extending a substantial distance into the opening in the body. Coaxial bores of a predetermined small diameter extend through the head and shank portions of each of the end caps to define a restricted channel through the length of the retriever for receiving and confining a fishing line. A slot in each of the end caps in communication with the bore of each cap is alignable with the body slot to permit the fishing line to be fed into the channel, and each cap slot is further disposed for disalignment with the body slot when the shoulders on the end cap frictionally engage with the abutment surfaces of the body, to close the channel and retain the fishing line. Means are also provided on one of said end caps to secure an auxiliary line to the retriever.

---

The present invention relates to artificial plug or fish hook retrievers, and has for its principal object the provision of a new and improved plug retriever structure which may be readily secured to a fishing line for engaging and releasing snagged plugs or the like from underwater obstructions.

Another object of this invention is to provide an improved plug retriever which securely confines the fishing line within a smooth restricted opening, and which is free from any substantial external projections, so that the retriever may freely slide downwardly on the line without entrapping any underwater obstruction between the line and the retriever or otherwise becoming snagged underwater.

A still further object of this invention is to provide an improved plug retriever which is extremely durable in use, and which may be rapidly and inexpensively manufactured from a minimum number of parts by standard manufacturing techniques.

More specific objects and features of this invention will become apparent from a description of an embodiment thereof, as shown in the accompanying drawing. In this drawing:

FIGURE 1 is a perspective view illustrating the retriever according to this invention in position on a fishing line;

FIGURE 2 is a longitudinal sectional view of the retriever shown in FIGURE 1 assembled in a condition for mounting on a fish line;

FIGURE 3 is a sectional view taken along the line 3—3 in FIGURE 2;

FIGURE 4 is a sectional view taken along the line 4—4 in FIGURE 2;

FIGURE 5 is a sectional view taken along the line 5—5 in FIGURE 2;

FIGURE 6 is a longitudinal sectional view of the retriever in accordance with this invention shown mounted on and secured to a fish line;

FIGURE 7 is a sectional view taken along the line 7—7 in FIGURE 6;

FIGURE 8 is a sectional view taken along the line 8—8 in FIGURE 6; and

FIGURE 9 is a sectional view taken along the line 9—9 in FIGURE 6.

Referring now to this drawing, the illustrated embodiment of the improved retriever in accordance with this invention includes a cylindrical main body 10 which is made of a suitable heavy and corrosive-resistant metal such as brass. This cylindrical body 10 is preferably provided with a knurled peripheral portion 11 so that the body may be readily gripped, even when wet, and has its ends machined smooth to define flat opposing end abutments 12 and 13, as shown in FIGURE 2.

FIGURES 2 and 4 show that the center of cylindrical body 10 is drilled and continuously tapped to provide a threaded axial opening 14 extending therethrough, and further show that the body 10 is also cut to include a longitudinal slot 15. This slot 15 extends the length of body 10, and brings the opening 14 into communication with the periphery of the body so that the body may be mounted on a fish line L leading to the snagged plug, as hereinafter described. The mouth of slot 15 preferably has outwardly flared or beveled edges 16 (FIGURES 4 and 8) to assure that the fish line L can be readily fed into the slot.

The retriever in accordance with this invention further includes a pair of end caps 20 and 30 which are threadably engaged with the body 10, as clearly shown in FIGURES 2 and 6. It is a feature of this embodiment that these end caps 20 and 30 are interchangeable so that the retriever may be economically manufactured and readily assembled. Preferably, both end caps 20 and 30, and the body 10, are made from the same heavy material, such as brass.

As shown in the drawing, these end caps 20 and 30 include head portions 20' and 30' of cylindrical configuration similar to the body 10, and have substantially the same diameter as the cylindrical body 10 so that the assembled retriever is free from external projections which might otherwise become snagged on underwater debris, such as tree branches, rocks or seaweed, during the plug retrieving operation. The periphery of head portions 20' and 30' of these caps also includes knurled portions 21 and 31 for easy gripping of the caps when mounting the retriever on the fishing line. As clearly illustrated in FIGURES 1, 2 and 6 of the drawings, the top portion of the upper end cap 30 has a convex dome-like shape in the preferred embodiment of the invention, so that the retriever is free of sharp corners or surfaces which may otherwise become caught on some under-water obstruction.

Referring to FIGURE 2, the inside surfaces of these end caps are machined to define a pair of radial annular shoulders 22 and 32, respectively, positioned for frictional engagement with the radial abutments 12 and 13 of the retriever body 10, as described in more detail hereinafter. FIGURE 2 additionally shows that the caps 20 and 30 also include externally threaded central shank portions 23 and 33 joined to head portions 20' and 30' and threadably engaged with the threaded opening 14 in the body 10 within opposite ends thereof. The rotation of the end caps 20 and 30 in a predetermined direction will therefore advance the threads on shanks 23 and 33, and draw each of the end caps inwardly into engagement with the retriever body 10. The threads on shanks 23 and 33 are preferably of the same type, e.g., righthanded, to assure that the caps are completely interchangeable. Similar type threads for both shanks 23 and 33 are also advantageous in the mounting of the retriever in accordance with this invention on a fishing line, since the rotation of the end caps 20 and 30, draw the caps together against the body 10, thus requires the application of opposite and counterbalancing torque forces to the caps.

To provide a smooth central channel or opening for slidably receiving the fishing line L, each of the end caps 20 and 30 further includes an axial bore, 24 and 34, respectively. These bores 24 and 34 extend through head portions 20' and 30' and shanks 23 and 24, and are coaxially aligned when the plug retriever is assembled, as shown in FIGURE 2. In addition, the bores 24 and 34 are of restricted diameter, in the order of .125 of an inch, so that the line L is securely retained within the coaxial bores when the retriever is mounted thereon.

The restricted diameter of bores 24 and 34 thereby confines the fishing line L within a smooth channel, but permits the retriever to slide freely down the line L into engagement with a snagged plug P, as shown in FIGURE 1. This restricted bore diameter further improves the operation of the retriever by preventing the entrapment of obstacles, such as seaweed and rocks, between the line L and the retriever which may otherwise prevent the retriever from descending into engagement with the snagged plug P. In order to completely confine line L within the smooth channel defined by the coaxial bores 24 and 34, it is an additional feature of this invention to make the combined length of shanks 23 and 33 substantially equal to the length of the cylindrical body 10. By this arrangement, the smooth channel defined by the bores 24 and 34 is essentially continuous when the retriever in accordance with this invention is assembled about the fish line L. In this embodiment, FIGURE 6 illustrates that this channel is broken only by a small gap G, of approximately .125 inch, which permits the use of liberal machine tolerances in the manufacture of this retriever. This small gap G also assures that the frictional engagement between the annular shoulders 22 and 32 and the abutments 12 and 13 will not be hindered by contact between the inner ends of the shanks 23 and 33 when the retriever is secured to the fishing line.

FIGURES 3 and 5 clearly show that the end caps 20 and 30 also include longitudinal slots 25 and 35, respectively. These slots extend along the length of the end caps, through the head and shank portions of each cap, and are in communication with the above-described restricted bores 24 and 34. It is apparent that the slots 25 and 35, when aligned with the slot 15 on the body 10, provide a passage through which the line L may be fed into the bores 24 and 34. To expedite the feeding of the line L therein, these slots 25 and 35 are also preferably provided with beveled or flared edges 26 and 36, as shown in FIGURES 3 and 5.

The retriever in accordance with this invention is also provided with connecting means to join the retriever to an auxiliary line L', as seen in FIGURE 1. Although other means, such as a wire bail, may be provided, it is preferred that this connecting means be recessed so that no external projections appear on the retriever which might become snagged on some underwater obstruction. Accordingly, the end plug 30 in this embodiment is provided with a recess 40 for receiving the auxiliary line L', as shown in FIGURE 2. Further, a pin 41, to which the end of line L' can be secured, is fixed across the recess 40. The connection between the line L' and the plug retriever is thus recessed, and does not present any projection which may become snagged underwater during the use of the retriever.

To connect the above-described plug retriever in accordance with this invention to the fishing line L, the assembled retriever, comprising the body 10 and the end plugs 20 and 30, is adjusted so that the slots 25 and 35 provided on the end plugs are in alignment with the longitudinal slot 15 on the body 10. As shown in FIGURES 3 through 5, this adjustment of the retriever, accomplished by rotating the end caps 20 and 30, provides a continuous longitudinal slot extending the length of the plug retriever which is in direct communication with the smooth channel defined by the coaxial restricted bores 24 and 34. After such adjustment, the retriever in accordance with this invention is placed on line L by feeding the line through this continuous slot until it rests within the restricted bores 24 and 34. With the line L in place within the continuous channel defined by the coaxial bores 24 and 34, the end caps 20 and 30 are rotated so that the advance of the threads on shanks 23 and 33 brings the shoulders 22 and 32 of the end caps into frictional engagement with the abutments 12 and 13 defined by the ends of the body 10. Sufficient tightening of these end caps 20 and 30 thereby provides a frictional engagement between the body and the caps which prevents the caps from loosening during the plug retrieving operation.

As more clearly illustrated in FIGURES 6 through 9, the tightening of the end caps 20 and 30 also disaligns the slots 25 and 35 with the slot 15 in the body 10, and securely confines the line L within the smooth bores 24 and 34. The retriever in accordance with this invention is thereby mounted on the line L and may then slide freely down the line into engagement with the plug P and release the snagged plug from the underwater obstruction.

It will be appreciated that the foregoing description is merely illustrative of an embodiment of this invention. Various modifications of the aforementioned embodiment of this plug retriever may be devised by those skilled in the art without departing from the scope of this invention, as set forth in the accompanying claims.

What is claimed is:
1. A fish hook and plug retriever comprising
  a heavy elongated body terminating in end portions defining oppositely disposed abutment surfaces, said body having an internally threaded central opening extending longitudinally therethrough and further having a longitudinal body slot in communication with said opening along the length of said body;
  an end cap threadably connected to said body adjacent each of said abutment surfaces, each end cap including a head portion having substantially the same external configuration as the external configuration of said body and defining a shoulder frictionally engageable with said adjacent abutment surface on said body;
  each of said end caps further including a central externally threaded shank portion joined to said head portion and extending a substantial distance into said opening in threaded engagement with said body, the combined length of said shanks being substantially equal to the length of said body so that said shanks together extend through substantially the entire length of said opening with said shoulders on said end caps frictionally engaged with said abutments on said body;
  a small bore on the order of .125 inch extending longitudinally through said head and shank portions of each of said end caps with said bores in coaxial alignment to define a restricted channel through the length of said plug retriever for securely confining a fishing line; and
  a longitudinal cap slot in each of said end caps extending along said head and shoulder portions in communication with said bore and disposed for alignment with said body slot to provide a passage for feeding said fishing line into said channel, said cap slots further disposed for disalignment with said body slot with said shoulders on said end caps frictionally engaged with said abutment surfaces on said body to close said channel so that said line is slidably retained within said channel, whereby said end caps and said body provide a substantially projection-free plug retriever and whereby said line is securely retained within said channel so that said re- triever may freely slide downwardly thereon into impact with the snagged article to be retrieved.

2. A fish hook and plug retriever comprising
a heavy elongated body terminating in end portions defining oppositely disposed abutment surfaces, said body having an internally threaded central opening extending longitudinally therethrough and further having a longitudinal body slot in communication with said opening along the length of said body;
an end cap threadably connected to said body adjacent each of said abutment surfaces, each end cap including a head portion having substantially the same external configuration as the external configuration of said body and defining a shoulder frictionally engageable with said adjacent abutment surface on said body,
each of said end caps further including a central externally threaded shank portion joined to said head portion and extending a substantial distance into said opening in threaded engagement with said body, the combined length of said shanks being substantially equal to the length of said body so that said shanks together extend through substantially the entire length of said opening while leaving a slight gap between the ends of the shanks with said shoulders on said end caps frictionally engaged with said abutments on said body;
a small bore on the order of .125 inch extending longitudinally through said head and shank portions of each of said end caps with said bores in coaxial alignment to define a substantially continuous restricted channel through the length of said plug retriever for securely confining a fishing line;
a longitudinal cap slot in each of said end caps extending along said head and shoulder portions in communication with said bore and disposed for alignment with said body slot to provide a passage for feeding said fishing line into said channel, said cap slots further disposed for disalignment with said body slot with said shoulders on said end caps frictionally engaged with said abutment surfaces on said body to close said channel so that said line is slidably retained within said channel, whereby said end caps and said body provide a substantially projection-free plug retriever and whereby said line is securely retained within said continuous channel so that said retriever may freely slide downwardly thereon into impact with the snagged article to be retrieved.

3. A fish hook and plug retriever according to claim 2 wherein the length of each of said shanks extendable within said opening is substantially equal to one-half of the length of said body.

4. A fish hook and plug retriever according to claim 2 wherein one of said end caps includes means to connect an auxiliary line to said retriever, and wherein said one end cap includes a convex and dome-like end portion, whereby said one end cap is free from projections which may snag on an underwater obstruction.

5. A fish hook and plug retriever according to claim 4 wherein said means to connect said auxiliary line to said retriever comprises a groove defined by said head portion of one of said end caps and a connecting pin joined to said head portion and extending across said groove to receive said auxiliary line, whereby said connecting means is recessed so that the external configuration of said retriever is substantially projection-free.

6. A fish hook and plug retriever comprising
a heavy cylindrical body terminating in end portions defining radially disclosed abutment surfaces, said body having an internally threaded opening extending axially therethrough and further having a radial body slot in communication with said opening along the length of said body;
an end cap threadably connected to said body adjacent each of said abutment surfaces, each end cap including a cylindrical head portion having substantially the same diameter as said body and defining an annular shoulder frictionally engageable with said adjacent abutment surface on said body,
each of said end caps further including a central externally threaded shank portion joined to said head portion and extending a substantial distance into said axial opening in threaded engagement with said body, the combined length of said shanks being substantially equal to the length of said body so that said shanks together extend through substantially the entire length of said axial opening with said shoulders on said end caps frictionally engaged with said abutments on said body;
a small axial bore on the order of .125 inch extending longitudinally through said head and shank portions of each of said end caps with said bores in coaxial alignment to define a substantially continuous restricted channel through the length of said plug retriever for securely confining a fishing line;
a radial cap slot in each of said end caps extending along said head and shoulder portions in connection with said bore and disposed for alignment with said body slot to provide a passage for feeding said fishing line into said channel, said cap slots further disposed for disalignment with said body slot with said shoulders on said end caps threadably advanced into frictional engagement with said abutment surfaces on said body to close said channel so that said line is slidably retained within said channel; and
means to connect an auxiliary line to one of said end caps;
whereby said end caps and said body provide a substantially projection-free plug retriever and whereby said line is securely retained within said channel so that said retriever may freely slide downwardly thereon into impact with the snagged article to be retrieved.

7. A fish hook and plug retriever according to claim 6 wherein said means to connect said auxiliary line to one of said plug caps comprising a groove defined by said head portion of said end cap and a connecting pin joined to said head portion and extending across said groove to receive an auxiliary line, whereby said connecting means is recessed in said end cap so that the external configuration of said retriever is substantially projection free.

8. A fish hook and plug retriever according to claim 6 wherein the length of each of said shanks extendable within said opening is substantially equal to one-half of the length of said body.

References Cited
UNITED STATES PATENTS

| | | | |
|---|---|---|---|
| 2,385,415 | 9/1945 | Jackson | 43—17.2 |
| 2,651,132 | 9/1953 | Lennen | 43—17.2 |
| 3,224,132 | 12/1965 | Frantz | 43—17.2 |

SAMUEL KOREN, *Primary Examiner.*

D. J. LEACH, *Assistant Examiner.*